United States Patent [19]

Wang et al.

[11] Patent Number: 5,512,287
[45] Date of Patent: Apr. 30, 1996

[54] PRODUCTION OF β-GLUCAN AND β-GLUCAN PRODUCT

[75] Inventors: Linji Wang; Ike E. Lynch, both of Dillon; Kenneth Goering, Bozeman, all of Mont.

[73] Assignee: Centennial Foods, Inc., Dillon, Mont.

[21] Appl. No.: 241,857

[22] Filed: May 12, 1994

[51] Int. Cl.$^6$ .......................... A61K 35/78; C07H 11/00; C07H 15/00; C07H 1/00

[52] U.S. Cl. ............. 424/195.1; 536/4.1; 536/123.12; 536/18.5; 426/436; 127/34; 127/43

[58] Field of Search .............. 424/195.1; 536/4.1, 536/18.5, 123.12; 426/436; 127/34, 43

[56] References Cited

U.S. PATENT DOCUMENTS

| | | | |
|---|---|---|---|
| 4,028,468 | 6/1977 | Hohner et al. | 426/436 |
| 4,804,545 | 2/1989 | Goering et al. | 426/28 |
| 5,013,561 | 5/1991 | Goering et al. | 426/28 |
| 5,106,640 | 4/1992 | Lehtomäki et al. | 426/436 |
| 5,183,677 | 2/1993 | Lehtomäki et al. | 426/436 |

*Primary Examiner*—John W. Rollins
*Attorney, Agent, or Firm*—Lowe, Price, LeBlanc & Becker

[57] ABSTRACT

Cereal grains are ground, slurried in water below the starch gelatinization temperature. Bran, starch granules and protein are removed. β-Glucan is precipitated and dehydrated with alcohol, screened and ground to become a white-colored product with a neutral flavor. The method recovers from 33 to 75 percent of the total natural occurring β-glucan in cereal grains. The β-glucan product is water soluble with purity ranging from 60–90 percent and exhibiting molecular weight of β-glucan ranging from $4 \times 10^5$ daltons to $2 \times 10^6$ daltons.

19 Claims, No Drawings

PRODUCTION OF β-GLUCAN AND β-GLUCAN PRODUCT

TECHNICAL FIELD

The present invention is directed to a unique method of producing β-glucan from cereal grains and the product produced thereby. In particular, the process provides a method for producing β-glucan in the form of a white powder which has a higher purity and molecular weight than existing extraction techniques.

BACKGROUND OF THE INVENTION

β-Glucan is a naturally occurring polysaccharide in the cell walls of cereal grains with its contents ranging from less than one percent in wheat to 16 percent in barley grain. β-Glucan has been extracted from oat and barley grain in small quantities in various laboratories.

Soluble fiber is a desired nutritional component which is lacking in the average American diet. High purity forms of soluble fiber are useful in various food applications to increase the daily soluble fiber consumption to recommended levels. Presently, β-glucan is not available in commercial quantities due to the lack of a successful method for β-glucan extraction.

U.S. Pat. No. 4,028,468 to Hohner et al. (1977) outlines a method to extract β-glucan from oat groat. Groats are hulled, usually crushed grain, especially oats. According to Hohner et al., oat groat is flaked, the oil extracted, dried, ground and air classified to produce a coarse milling fraction. The extraction of β-glucan includes mixing the coarse fraction with water, adjusting the pH twice, chilling the water extract to 4° C., and drying β-glucan in a vacuum dryer. The multiple pH adjustments, the use of oil extraction, air classification and vacuum drying are expensive processing steps which make the invention economically disadvantageous from a commercial production point of view. High purity β-glucan fractions, (over 50 percent pure β-glucan) were not reported using this technique.

U.S. Pat. Nos. 4,804,545 (1989) and 5,013,561 (1991), both to Goering et al., outline a method to extract β-glucan from waxy barley grain. Waxy barley grain is ground and mixed with water, centrifuged to remove bran and starch, boiled to destroy the activity of β-glucanase, centrifuged to remove the coagulated protein which contains a high percentage of oil and the extract passed through an ultrafilter to purify the β-glucan. The β-glucan solids are dried on a drum dryer or a spray dryer. Recovering the solids using this technique with a drum dryer or a spray dryer produces a light yellowish-brown colored product with purity of β-glucan less than 50 percent by weight of the product. These two inventions produce β-glucan products with undesirable β-glucan purity and low molecular weights.

U.S. Pat. Nos. 5,106,640 (1992) and 5,183,677 (1993) both to Lehtomäki et al. outline a method to produce a β-glucan enriched alimentary fiber from oats and barley. Barley or oat grains are dehulled, optionally ground and slurried in water at about 8° C. with ethanol addition. The slurry is screened and a product is collected. The product contains 15–40 percent β-glucan and about equal amounts of starch and some protein. This invention does not produce a β-glucan product having a purity of more than 50 percent by weight of the product.

Because of the high cost and complexity of the previous inventions, it has not been possible to provide a β-glucan product world-wide for food and pharmaceutical uses. Further, the purity of the products from the prior arts are either low or unknown.

In contrast, the present invention provides a method for the recovery of β-glucan from cereal grain which overcomes the disadvantages of the previous inventions. Using the method of the present invention, any person skilled in the art can produce a high purity (60 percent– 90 percent) β-glucan product from cereal grains.

SUMMARY OF THE INVENTION

Besides the objectives and advantages implied in the description of the preferred embodiments, the major objectives and advantages of the present invention include:

providing a novel method of recovering β-glucan from a water extract of cereal grains;

providing a novel method of recovering β-glucan from the water extract of cereal grains with lower production cost;

providing a novel method of recovering β-glucan by which 33 percent to 75 percent of the naturally occurring β-glucan in cereal grains can be extracted and recovered;

providing a β-glucan product which contains 60–90 percent β-glucan;

providing a β-glucan product in which the molecular weights of the β-glucan range from $4 \times 10^5$ daltons to $2 \times 10^6$ daltons; and providing a β-glucan product in the form of a white-colored powder exhibiting a neutral flavor which is readily soluble in water and develops significant viscosity.

DETAILED DESCRIPTION OF THE INVENTION

β-Glucan from cereal grains comprises a family of linear polysaccharides comprising D-glucopyranosyl units. Most D-glucopyranosyl units are linked by (1→4) β-linkages in blocks of two to three contiguous residues. These blocks are further linked together by (1→3) β-linkages. This structure accounts for 90 percent of the polysaccharide.

Approximately 10 percent by weight of a β-glucan molecule contains longer blocks made of from 4 to 14 adjacent D-glucopyranosyl units with (1→4) β-linkages. The presence of (1→3) β-linkages located in the kinks of the molecules makes the β-glucan different from cellulose. The molecular weights of β-glucan of cereal grains range from $5 \times 10^5$ daltons to $3 \times 10^6$ daltons.

To start the extraction process of β-glucan according to the present invention, cereal grain is preferably finely ground and then mixed with water. The β-glucan molecules, which break away from the cell wall and become dissolved in water, can be recovered as a commercial product.

Thereafter, β-glucan is extracted with water from cereal grains by slurrying the ground grain with water, removing bran, starch granules and protein from the water extract of cereal grains, precipitating and dehydrating the β-glucan with alcohol. The finished product of the present invention is a white-colored powder having a neutral flavor. The product contains 60–90 percent β-glucan with the molecular weights of the β-glucan ranging from about $4 \times 10^5$ daltons to about $2 \times 10^6$ daltons. The method recovers from 33 to 75 percent of the natural occurring β-glucan from the starting cereal grain.

β-Glucan is found mainly in barley and oat grains, but also occurs in wheat and corn. Both barley and oat β-glucan have been shown to have cholesterol-lowering activities in animal studies. Thus, β-glucan may potentially have a medical use. As a natural cereal fiber, β-glucan may also be used in various food systems as a natural soluble fiber additive. With the advent of the Nutritional Labeling and Education Act (NLEA), more emphasis will be placed on advising consumers as to the dietary fiber content of all food products.

Accordingly, the present invention is directed to a process of obtaining a water extract of cereal grains comprising:

a. slurrying ground cereal grains, mixtures of grain or grain fractions in water;

b. removing bran and starch granules from the slurry;

c. destroying β-glucanase activity and coagulating a protein/oil fraction; and d. removing the coagulated protein/oil fraction from the slurry.

The invention is further directed to a process of recovering β-glucan from a water extract of cereal grain comprising:

a. providing a starting material of cereal grains which have been mixed with water to obtain a water extract;

b. precipitating β-glucan with alcohol in the water extract of said cereal grains at the concentrations of about 15 to 45 percent, preferably about 21–34 percent, by the weight of the alcohol-water mixture;

c. precipitating β-glucan for about 10 minutes to 1.5 hours, preferably about 30–60 minutes;

d. dehydrating the β-glucan solids with alcohol; and e. collecting the dehydrated β-glucan by screening.

The process of the present invention extracts from 33 to 75 percent of the total β-glucan in cereal grains and the starting cereal grain comprises a mixture of grains or grain fractions containing from 2 to 30 percent naturally occurring β-glucan.

The alcohol concentrations in the dehydration step are preferably from about 50 to 95 percent, more preferably are from 70 to 90 percent, by the weight of the mixture. The alcohol used in the precipitation may be any alcohol capable of dehydrating the β-glucan. Preferred alcohols are selected from the group consisting of isopropanol and ethanol.

The dehydrated β-glucan is preferably collected by screening. Preferred screen openings range from about 40 micrometers to 425 micrometers.

The β-glucan product produced according to the present invention is surprisingly a white-colored powder having a neutral flavor. The present invention provides β-glucan product having a purity of 60–90 percent in which the molecular weights of the β-glucan range from $4 \times 10^5$ daltons to $2 \times 10^6$ daltons.

BEST MODE FOR CARRYING OUT THE INVENTION

The starting material may include any cereal grain, mixture of grains, or grain fractions. The grain or fraction is finely ground and mixed with water at about 50° C. for 30–60 minutes. Lower temperatures, such as room temperature, 30° and 40° C. are possible but not preferred. Temperatures higher than 50° C. may be used as long as the cereal starch granules are not gelatinized. A temperature of about 50° C. avoids the gelatinization of cereal starch granules and is most preferred.

The slurry is thereafter centrifuged at about 3000–4000 times the earth gravity to remove bran and starch granules. Then, the liquid phase from the centrifugation step is heated to about 90° C.–125° C. and preferably kept at the temperature for about 4–10 minutes or for a time sufficient to destroy the activity of β-glucanase and coagulate the protein/oil complex.

The liquid is then centrifuged at about 3000–4000 times of earth gravity to remove the coagulated protein/oil complex. The liquid from the centrifugation step is then cooled in a heat exchanger to a temperature of about 30° C.–60° C. This liquid is defined here as the water extract of cereal grains.

Alcohol is added to the water extract so that the resulting mixture has a final alcohol concentration of about 15 to 45 percent, more preferably about 21–34 percent. Any dehydrating alcohol may be used, but preferably, ethanol, isopropanol are used in the precipitation step. The precipitation step takes from 30 to 60 minutes. β-Glucan is collected by centrifugation at about 3000–4000 times of earth gravity.

A unique feature of this invention is that the purity of β-glucan in the final product increases with a decrease in alcohol concentrations used in the precipitation step. The length of precipitation time also influences final product purity. Higher purities of β-glucan will be achieved with decreased precipitation time.

The β-glucan solids collected in the above precipitation step quickly retrograde to become a rubber-like solid material which becomes a grayish-brown color when dried in the air. To obtain the white-colored, powdery product of the present invention, the β-glucan solids collected in the above precipitation step are dehydrated by immediately mixing with pure alcohol. Preferably, the combined mixture of alcohol and β-glucan solids result in an alcohol concentration of about 70– 90 percent. Lower concentrations, such as about 45 to less than 70 percent are permitted; however, the drying is preferably accompanied by utilizing a vacuum dryer to avoid discoloration and undesired hard textures.

The resuspended solids are collected by screening the mixture through screens with openings of 40–425 micrometers. The solids are then dried using conventional air drying methods and ground to desirable particle size to become a finished product. It is a unique and surprising feature of the present invention that the β-glucan solids dehydrated by alcohol at the said concentrations and dried in hot air exhibit a final product which is white and whose texture is powdery. It is also surprising that when alcohol concentrations lower than 70 percent are used in the dehydration step and dried in hot air, the typical resulting grayish-brown, hard-textured product may be avoided by utilizing a vacuum dryer in conjunction with the alcohol dehydration.

EXAMPLE 1

Seven kilograms of oat groat was ground and mixed with 49 liters of water at 50° C. for 30 minutes. The slurry was centrifuged at 3800 times of earth gravity. The liquid from the centrifugation was heated to 93° C. and kept at the temperature for 30 minutes and thereafter cooled to 40° C. The liquid was centrifuged at 3800 times of earth gravity. The liquid phase from the centrifugation was mixed with isopropanol at half volume of the liquid phase. The precipitated β-glucan was recovered after 45 minutes by centrifugation at 3800 times of earth gravity. The solids were dehydrated by mixing with 4 liters of isopropanol for 2 minutes. The solids were collected by a screen with 180 micrometer openings and dried in a tray dryer at 60° C.

This process yielded 145 grams of oat β-glucan, which is 2.1 percent by the weight of the oat groat. The finished product was a white-colored powder with a neutral flavor. The average molecular weight of the β-glucan in the product was $6 \times 10^5$ daltons. The chemical composition of the product was as follows:

| Component | % of total |
|---|---|
| β-Glucan | 75 |
| Starch | 8 |
| Protein | 4 |
| Fat | <1 |
| Ash | <1 |

EXAMPLE 2

One hundred kilograms of dehulled barley grain was ground and mixed with 700 liters of water at 50° C. for 40 minutes. The slurry was centrifuged in a horizontal centrifuge at 3500 times of earth gravity. The liquid phase was heated up to 115° C. in a jet cooker and held for 4 minutes. The liquid was then cooled to 50° C. in a heat exchanger. The liquid was centrifuged through a horizontal centrifuge again at 3500 times of earth gravity. The liquid phase from the centrifugation step was mixed with one half volume of isopropanol. The precipitation took about 30 minutes. β-Glucan solids were collected by centrifugation through a horizontal centrifuge at 3500 times of earth gravity. The solids were mixed with 40 liters of isopropanol for 5 minutes. The dehydrated β-glucan was collected by screening the mixture through a screen with 45 micrometer openings, and dried in a belt dryer.

This process yielded 3500 grams β-glucan, which was 3.5 percent by weight of the barley grain. The product was a white-colored powder with a blend flavor. The average molecular weight of the β-glucan was $1.6 \times 10^6$ daltons. The chemical composition was as follows:

| Component | % of total |
|---|---|
| β-Glucan | 87 |
| Starch | 4 |
| Protein | 2 |
| Fat | <1 |
| Ash | <1 |

The invention has been described herein with reference to certain preferred embodiments. However, as obvious variations thereof will become apparent to those skilled in the art, the invention is not to be considered as limited thereto.

We claim:

1. A process for obtaining a water extract of cereal grains comprising:
   a. mixing ground cereal grains, mixtures of grain or grain fractions in water to form a slurry;
   b. centrifuging the slurry to remove bran and starch granules;
   c. heating the resulting liquid phase to destroy β-glucanase activity and to coagulate a protein/oil fraction;
   d. cooling the liquid phase in a heat exchanger; and
   e. centrifuging the liquid phase to remove the coagulated protein/oil fraction and to recover the water extract of cereal grains.

2. The process of claim 1, wherein the starting cereal grain, mixture of grains or grain fractions contain from about 2 to 30 percent naturally occurring β-glucan.

3. The process of claim 1, wherein the mixing step (a) takes place for about 30–60 minutes at a temperature ranging from about 30°–50° C. and higher provided cereal starch granules are not gelatinized.

4. A process according to claim 1, wherein the ground cereal grains, mixtures of grain or grain fractions are finely ground.

5. A process according to claim 1, wherein the resulting liquid phase in step (c) is heated to about 90°–125° C. for about 4–10 minutes.

6. A process according to claim 1, wherein the centrifugation in steps (b) and (e) is at about 3000 to 4000 times earth gravity.

7. A process according to claim 1, wherein the liquid phase in step (d) is cooled to a temperature of about 30°–60° C.

8. A process of recovering β-glucan from a water extract of cereal grain comprising:
   a. providing a starting material of cereal grains, mixtures of grain or grain fractions which has been mixed with water to obtain a water extract;
   b. mixing the water extract with an alcohol to precipitate the β-glucan;
   c. collecting the precipitated β-glucan by centrifugation;
   d. dehydrating the β-glucan by mixing with alcohol; and
   e. collecting the dehydrated β-glucan by screening.

9. A process according to claim 8, which extracts from 33 to 75 percent of the total β-glucan in cereal grains.

10. A process according to claim 8, wherein the grains are selected from the group consisting of barley and oat grain, or mixtures thereof.

11. A process according to claim 8 wherein the water extract in step (b) is mixed with the alcohol for about 30–60 minutes.

12. A process according to claim 8, wherein the centrifugation in step (c) is at about 3000 to 4000 times earth gravity.

13. A process according to claim 8, wherein mesh size during screening in step (e) is about 40 to 425 μm.

14. A process according to claim 8, further comprising drying the β-glucan with conventional air drying methods.

15. A process according to claim 8, further comprising grinding the β-glucan to a desirable particle size to become a final product.

16. A process according to claim 8, wherein the alcohol concentrations in the dehydration step is from 70 to 90 percent by the weight of the mixture and the alcohol used in the precipitation is selected from the group consisting of isopropanol and ethanol.

17. A β-glucan white-colored powder product having a molecular weight ranging from $4 \times 10^5$ daltons to $2 \times 10^6$ daltons with a neutral flavor and a purity of 60–90 percent by weight of the product.

18. A β-glucan white-colored product having a molecular weight ranging from $4 \times 10^6$ daltons to $2 \times 10^6$ daltons with a neutral flavor and a purity of 60 to about 90 percent by weight of the product.

19. A β-glucan white-colored product having a molecular weight ranging from $4 \times 10^6$ daltons to $2 \times 10^6$ daltons with a neutral flavor and a purity greater than 60 percent by weight of the product.

* * * * *